US007582176B2

(12) United States Patent
Panzetti

(10) Patent No.: US 7,582,176 B2

(45) Date of Patent: Sep. 1, 2009

(54) PROCESS AND APPARATUS FOR FORMING TUBULAR LABELS OF HEAT SHRINKABLE FILM AND INSERTING CONTAINERS THEREIN

(75) Inventor: Luigi Panzetti, Parma (IT)

(73) Assignee: Sidel Holdings & Technology SA, Pully (CH)

( * ) Notice: Subject to any disclaimer, the term of this patent is extended or adjusted under 35 U.S.C. 154(b) by 503 days.

(21) Appl. No.: 10/524,771

(22) PCT Filed: Aug. 25, 2003

(86) PCT No.: PCT/EP03/09389

§ 371 (c)(1), (2), (4) Date: Feb. 16, 2005

(87) PCT Pub. No.: WO2004/020291

PCT Pub. Date: Mar. 11, 2004

(65) Prior Publication Data

US 2006/0113024 A1 Jun. 1, 2006

(30) Foreign Application Priority Data

Aug. 27, 2002 (IT) .......................... PR2002A0049

(51) Int. Cl.
*B32B 37/00* (2006.01)

(52) U.S. Cl. ........................... 156/84; 156/86; 156/218

(58) Field of Classification Search ................. 206/460; 215/246; 53/389.1, 389.2, 389.3, 580, 585; 156/84–86, 423, 443
See application file for complete search history.

(56) References Cited

U.S. PATENT DOCUMENTS

| | | | | |
|---|---|---|---|---|
| 3,959,065 | A * | 5/1976 | Ashcroft | 156/423 |
| 4,199,851 | A * | 4/1980 | Doherty | 29/235 |
| 4,236,305 | A * | 12/1980 | Hetherington et al. | 29/774 |
| 4,286,421 | A | 9/1981 | Fujio | |
| 5,415,721 | A | 5/1995 | Nickey et al. | |
| 5,433,057 | A | 7/1995 | Lerner et al. | |
| 2003/0134061 | A1 * | 7/2003 | Benim et al. | 428/34.9 |

* cited by examiner

*Primary Examiner*—John L Goff
(74) *Attorney, Agent, or Firm*—Pearne & Gordon LLP

(57) ABSTRACT

A process for labelling containers or bottles by applying tubular labels made of heat shrinkable film which completely surround an outer surface area of the bottle. The process and machine include winding a precut label from a reeled film on a rotating tubular round plate supported by a roundabout labelling machine, the bottle abuts on the round plate and the label is wound on the underlying tubular portion. The tubular surface of the round plate is provided with a plurality of holes alternatively supplying or drawing air for establishing a positive or negative pressure respectively on the label surface. The overlapped vertical ends of the label are heat sealed by an electrically heated bar located at each round plate or are chemically bonded. The tubular round plate and the container on it can vertically move to transfer the container into the tubular label.

3 Claims, 3 Drawing Sheets

PROCESS AND APPARATUS FOR FORMING TUBULAR LABELS OF HEAT SHRINKABLE FILM AND INSERTING CONTAINERS THEREIN

The object of the present invention is a process for forming tubular labels made of heat shrinkable film and a machine for forming labels and inserting bottles or containers into the formed labels.

The linear machines of the prior art for applying tubular labels on containers show a low productivity. Another disadvantage of the prior art is that the labels are not formed on the labelling machine causing high production cost of the label.

The object of the present invention consists of transforming a rotating roundabout labelling machine in a labelling machine for tubular labels by forming a label from a precut label made of a reeled film in order to obtain the tubular label receiving the bottle.

The process and machine of the present invention offer many advantages, the most important are:

The cost of a tubular label is the same as the cost of a flat label cut from a reel;

It is possible to apply the tubular label with a rotating machine having higher productivity rate than a known linear machine.

Said objects and advantages are met by a process for forming tubular labels made of heat shrinkable film and machine for forming and applying said labels said labels on bottles or containers, the object of the present invention is characterized by the following claims.

These and other characteristics will be better outlined from the following description of a preferred embodiment shown as an illustrative non limiting example in the attached drawings, wherein.

Figure 1:
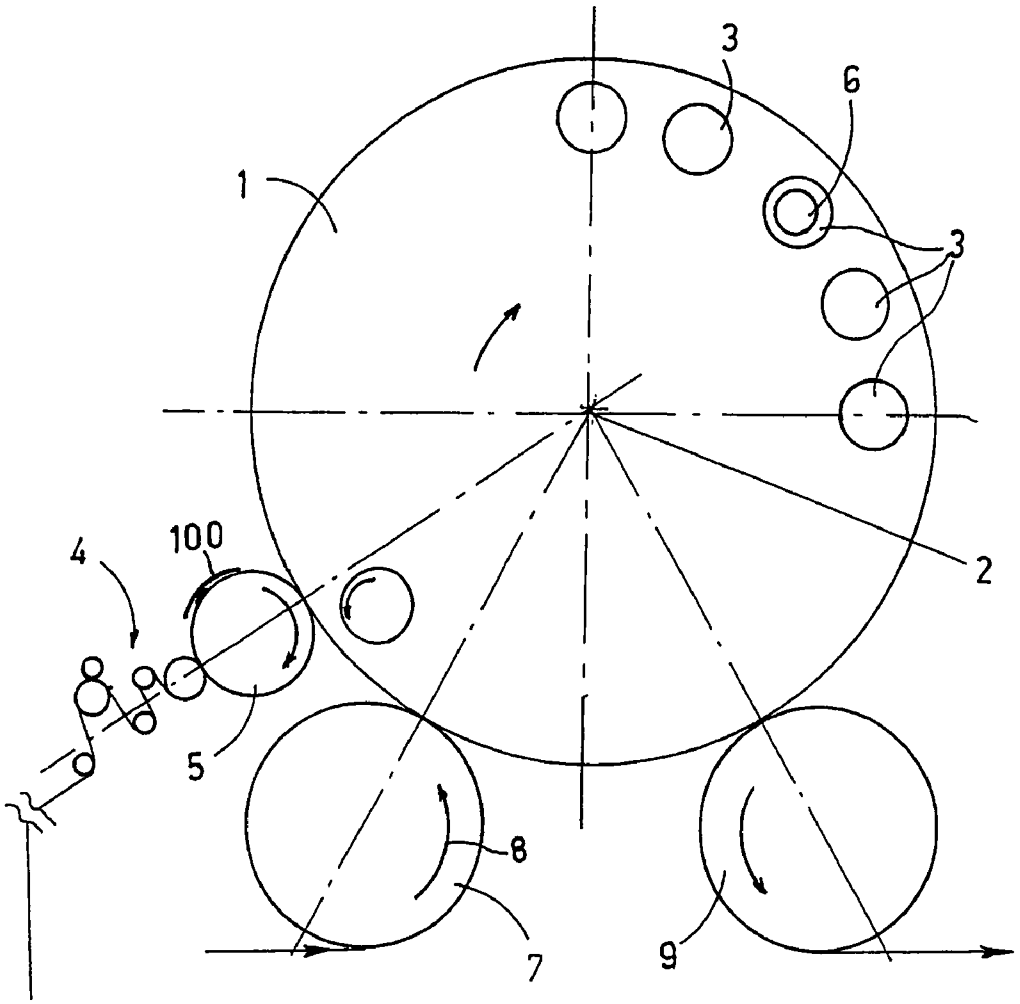
FIG. 1 is a simplified plan view generally showing the machine.

Referring to FIG. 1, 1 is a disk rotating around a vertical axis 2, said disk is known as roundabout.

A plurality of small round plates 3 are mounted on the roundabout which in turn can rotate around their own vertical axis as it will be described later.

4 is an assembly for unwinding a film from a reel, it comprises also a cutter for forming precut labels 100, said assembly is already known so that its detailed description is omitted.

5 is a drum for transferring precut labels, said drum, also known per se, is provided with negative pressure areas for adherently keep a precut label before transferring it on a round plate 3.

Containers or bottles 6 are transported on the round plate by a star-shaped inlet conveyor 7 rotating according to arrow 8 in a direction opposite to the rotation of the roundabout.

9 is a star-shaped conveyor for discharging the labelled containers, which conveyor will introduce said containers in a known heating tunnel (not shown) for heat shrinking each tubular label to adhere it on the outer surface of the corresponding container.

The heating tunnel can be substituted with a heat shrinking roundabout mechanically connected to the star-shaped discharge conveyor 9.

Figure 2:
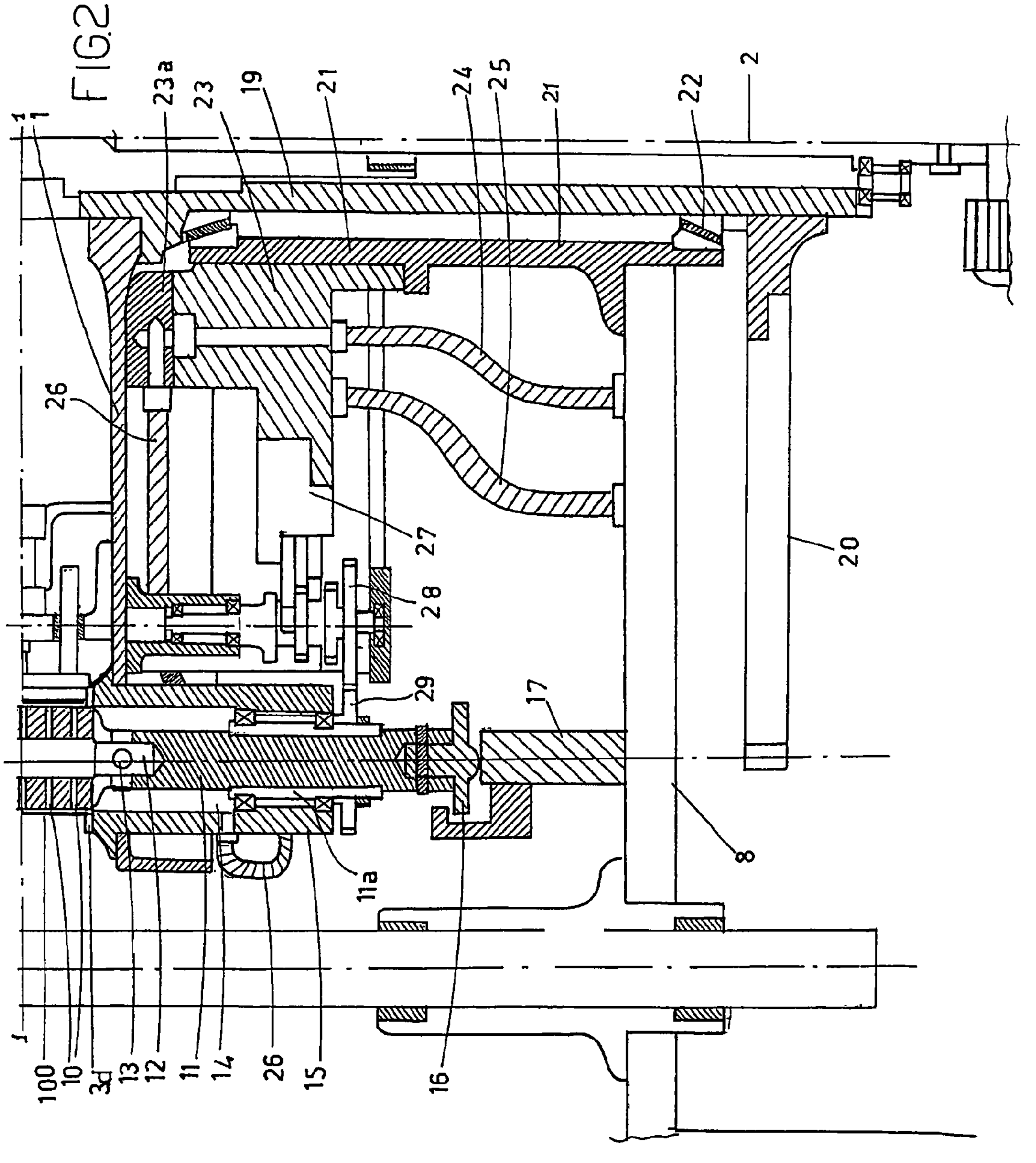
FIGS. 2 and 3 show respectively the bottom part and the top part of the machine separated by line 1-1.
Figure 3:
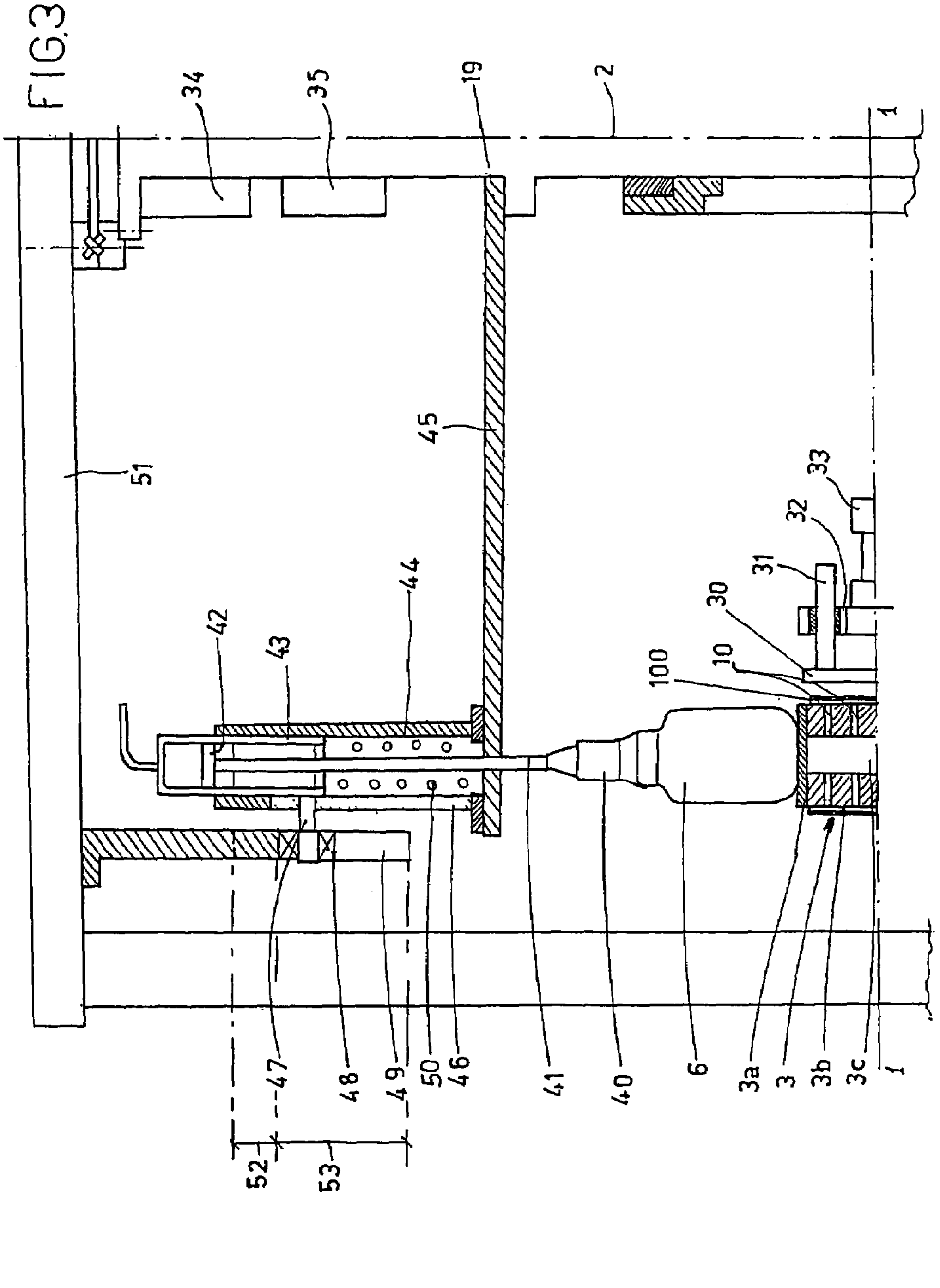

As better shown in FIGS. 2 and 3, each round plate 3 consists of an upper support surface 3*a* for supporting each container 6; a tubular element 3*b* descends from surface 3*a*, whose inner chamber 3*c* communicates with the outer surface by a plurality of evenly distributed holes 10.

The container support round plate has therefore a tubular shape, whose side surface is completely perforated so that a negative or positive pressure can be established on the surface of a tubular label 100 as will be better explained with reference to the operation of the machine.

The tubular round plate is supported by a shaft 11, a recess 12 defined in the top of shaft communicates by holes 13 with a chamber 14 defined by an outer jacket 15.

Diameter of chamber 14 is substantially the same as the outer diameter of the tubular round plate so that it can receive the latter when alternatively moves up and down.

To this end the shaft 11 abuts by a shim 16 made of antifriction material on an annular cam 17 supported by a surface 18 integral with the machine frame.

Outer jacket 15 is integrally supported by the disk or roundabout 1 coupled to shaft 19 driven by known means of which a gear wheel 20 is shown.

A stationary mounting 21 fixed to surface 18 supports said shaft 19 by thrust bearings 22.

An stationary air dispenser 23 fixed to the mounting 21 supplies air to a rotating dispenser 23 supported by the roundabout 1.

The stationary dispenser 23 is supplied by a duct 24 connected to a vacuum pump and a duct 25 connected to a blowing fan (not shown) the rotating dispenser 23*a* supplies, into a duct 26, chamber 14 which in turn supplies holes 10 with air at a negative or positive pressure depending on the location of the rotating dispenser.

A cycloidal cam 27 rotates the tubular round plate around its own vertical axis.

Cycloidal cam rotates also a gear wheel 28 meshing a gear wheel 29 coupled to a portion 11*a* of shaft 11.

A grooved portion 11*a* is provided on shaft 11 so that the latter can simultaneously translate and rotate around its vertical axis.

The cycloidal cam rotates the tubular round plate in order to move the label at a constant speed from the transfer drum to the tubular round plate and stop the latter for several seconds in order to seal the overlapped ends of the label in a predetermined position.

To this end, in the example shown, a sealing device is fixed to each round plate which comprises a bar heat sealing device 30 supported by horizontal sliding guides 31 carried by plate 32 integral with roundabout 1.

An air piston 33 moves the bar heat sealing device 30 from a rest position to a contact position in which the precut label ends are overlapped to form a tubular labels.

Electrical power and air are supplied to the heat sealing device by two rotating dispensers 34 and 35 respectively.

As shown in FIG. 3, a bell-shaped element 40 located upon the support surface 3*a* is coaxial with the tubular round plate 3, which element aligns bottle 6 on the round plate with the rotating axis of the latter during the rotation of the roundabout from the star-shaped inlet conveyor to the star-shaped discharge conveyor.

The bell-shaped element 40 is freely supported by a rod 41 whose end is fixed to a piston 42 slidingly received in a cylinder 43 which in turn slides in a jacket 44.

Jacket 44 is supported by a surface 45 integral with the rotating shaft 19 of the roundabout and defines a slot 46 from which projects a pin 47 whose first end is integral with the cylinder 43 and the second end supports a roller 48 adapted to engage a cam 49 by an elastic bias of a spring 50 inserted in said jacket 44.

Cam 49 is supported by a top surface 51 integral with the fixed frame of the machine and is contoured in order to move the bell-shaped element 40 along a first downward stroke 52 so that it can grip the bottle by its stopper and along a second downward stroke 53 to insert the bottle into the tubular label formed around the tubular round plate.

The insertion is carried out because the tubular round plate moves contemporaneously down with the bell-shaped element and for this reason cam 17 is contoured as cam 49 in the portion regarding the slope of the tubular round plate.

Cam 17 is therefore a means for moving downwardly the tubular round plate by a stroke which allows to transfer the bottle into the tubular label.

The top of cylinder 43 can be supplied with compressed air for moving the respective piston and rod 41 carrying the bell-shaped element in order to compensate the height difference of bottles with respect to an height of a sample bottle.

Surface 45 can change its vertical position with respect to the roundabout 1, according to known methods, for locating the machine according to the varying heights of different bottles.

In the following the operation of the machine will be described.

A bottle is put on the round plate 3 by the star-shaped inlet conveyor, at the same time the bell-shaped element 40 comes down on the bottle stopper blocking firmly the bottle on surface 3*a* while allowing its rotation.

Then, the tubular label (known as sleeve) supplied from assembly 4 and transferred by the drum 5 is formed by winding it on the tubular round plate 3 which it is now at a negative pressure so that the label adheres firmly on the outer surface of the tubular portion of the round plate.

During the formation of the tubular label, the round plate 3 is rotated by cinematic mechanisms connected to the cycloidal cam 27 in order to transfer the label at a constant speed.

The drum 5 rotation phase is different from that of the roundabout 1 rotation; due to that feature, in order to keep the constant speed condition, the transfer is carried out for a very small angle in comparison to a phase condition, so that the time necessary to seal the tubular label ends will take advantage of that.

After having completed the tubular label, when the vertical ends of the label are overlapped and in a prestablished position, the heat sealing device 30 seals in few seconds the overlapped ends forming the finished tubular label.

At this stage, the heat sealing bar will withdraw from the label and pressurized air will be introduced in chamber 3*c* and consequently air will be blown into holes 10 keeping the tubular label detached from the round plate in order to allow the bottle-plate assembly to descend from the risen position to the position wherein the surface 3*a* is flush with the jacket 15 by the conjugated operation of cams 17 and 49.

This position coincides with the bottle discharge position and the bell-shaped element 40 will be risen so that the star-shaped discharge conveyor discharges the bottle which will be subjected to a heat treatment to adhere the heat shrinkable label to the bottle.

After the bottle discharge, the tubular round plate will be risen by cam 17 to the higher position in order to receive a new bottle starting again a new cycle.

A plurality of round plates are located on the roundabout with respective heat sealing bars, centering bell-shaped elements; obviously on the round plates every operative step will be performed while the roundabout rotates.

Each heat sealing system is independently operated by one electrical valve synchronized in order to ensure the correct sealing according to the varying angular speed of the roundabout.

The machine process is essentially based on the fact the precut label is wound on a tubular round plate carrying a bottle to be labelled; then the vertical overlapped ends of the precut label are heat sealed in a predetermined position forming a tubular label. The label is peeled off the tubular round plate by pressurized air jets, afterwards said bottle with its round plate can translate downwards for entering the label once the overlapped vertical ends are heat sealed. Then the label will be heated to adhere to the bottle.

The abovementioned machine can be easily modified to handle different bottle shapes or label size by substituting the cycloidal cam ensuring the constant speed during the transfer of the precut label from the drum 5 to the tubular round plate and substituting the tubular round plate and the associated disk 3*d* depending on the bottle diameter.

The versatility of the machine is also demonstrated by the fact the label bottom edge always abuts the ring 3*d* surface.

In the specification the label ends have been bonded by heat sealing, however they can be bonded with other methods, such as chemical sealing, or more generally by adhesives.

The invention claimed is:

1. Process for forming tubular labels made of heat shrinkable films and adhering them on bottles or containers, said process providing the transfer of the bottles or containers into the formed tubular labels, so-called sleeves, by a down movement of said bottles or containers into the sleeve, wherein the process comprises: the steps of unwinding and cutting a heat shrinkable film from a reel for obtaining precut labels having a length slightly longer than a cross-section perimeter of the bottle; the step of transferring the precut label by a drum provided with areas for drawing the precut label, characterized by the fact it comprises the additional steps of:

winding the precut label on a rotating tubular-shaped plate supporting the container or bottle to be labelled;

sealing both vertical overlapped ends of the precut label in a predetermined position for obtaining a tubular label, said sealing step comprising heat sealing or adhesives;

removing the label from the tubular plate and transferring the plate and the container on it in order to insert the latter into the tubular label in the position in which the label will be located;

heating the container to heat shrink the label on the container.

2. Process according to claim 1 characterized by the fact the step of winding the precut label on the tubular plate is performed by establishing a negative or positive air pressure on the side surface of the plate.

3. Process according to claim 1 characterized by the fact the step of removing the tubular label from the tubular plate is performed by establishing a pressure or an air jet on the inner surface of the label.

* * * * *

UNITED STATES PATENT AND TRADEMARK OFFICE

CERTIFICATE OF CORRECTION

PATENT NO. : 7,582,176 B2
APPLICATION NO. : 10/524771
DATED : September 1, 2009
INVENTOR(S) : Luigi Panzetti It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1066 days.

Signed and Sealed this

Fourteenth Day of September, 2010

David J. Kappos
*Director of the United States Patent and Trademark Office*